United States Patent
Eckert

[19]

[11] Patent Number: 6,143,055
[45] Date of Patent: Nov. 7, 2000

[54] CARBON BASED COMPOSITE MATERIAL FOR MOLTEN METAL

[76] Inventor: C. Edward Eckert, 260 Lynn Ann Dr., New Kensington, Pa. 15068

[21] Appl. No.: 09/393,502

[22] Filed: Sep. 10, 1999

Related U.S. Application Data

[63] Continuation-in-part of application No. 09/105,942, Jun. 26, 1998, which is a continuation-in-part of application No. 09/059,924, Apr. 14, 1998, Pat. No. 6,066,289, which is a continuation-in-part of application No. 08/882,921, Jun. 26, 1997, Pat. No. 5,968,223.

[51] Int. Cl.⁷ .............................. B32B 15/00; B32B 18/00
[52] U.S. Cl. .......................... 75/671; 266/235; 428/408; 428/469; 428/472; 428/701; 428/702
[58] Field of Search ............................... 75/671; 266/235; 428/408, 469, 472, 701, 702

[56] References Cited

U.S. PATENT DOCUMENTS

| | | | |
|---|---|---|---|
| 3,724,447 | 4/1973 | Parkhill et al. | 126/360 |
| 3,975,212 | 8/1976 | Haupin et al. | 136/234 |
| 3,982,913 | 9/1976 | Feichtinger | 75/708 |
| 4,721,534 | 1/1988 | Phillippi et al. | 374/179 |
| 4,749,416 | 6/1988 | Greenspan | 136/234 |
| 4,750,716 | 6/1988 | Reeve-Parker | 266/225 |
| 4,784,374 | 11/1988 | Pelton | 266/235 |
| 4,871,263 | 10/1989 | Wilson | 374/140 |
| 4,984,904 | 1/1991 | Nakano et al. | 374/140 |
| 5,120,027 | 6/1992 | Pelton | 266/200 |
| 5,160,693 | 11/1992 | Eckert et al. | 266/235 |
| 5,364,450 | 11/1994 | Eckert | 75/678 |
| 5,415,680 | 5/1995 | Eckert | 75/405 |
| 5,462,580 | 10/1995 | Eckert | 75/678 |
| 5,462,581 | 10/1995 | Eckert | 75/678 |
| 5,474,282 | 12/1995 | Eckert | 266/280 |
| 5,603,571 | 2/1997 | Eckert | 374/140 |
| 6,066,289 | 5/2000 | Eckert | 266/275 |

FOREIGN PATENT DOCUMENTS

| | | | |
|---|---|---|---|
| 1107378 | 9/1978 | Japan | 374/140 |
| 0420889 | 3/1974 | U.S.S.R. | 374/140 |
| 0586343 | 12/1977 | U.S.S.R. | 374/140 |

OTHER PUBLICATIONS

Derwent Abstract of Japanese Document 57209885A Acc No 1983–13241k Dec. 23, 1982.

*Primary Examiner*—Melvyn Andrews
*Attorney, Agent, or Firm*—Andrew Alexander

[57] ABSTRACT

An improved shaft suitable for use in the treatment of molten aluminum including pumping or fluxing employing an impeller, comprised of a shaft material comprised of a carbon or graphite having an exterior surface and a refractory layer provided to cover the exterior surface of the shaft. The refractory layer is resistant to attack by the molten metal. The refractory layer and the carbon or graphite material have a coefficient of thermal expansion less than $5 \times 10^{-6}$ in/in/° F., the refractory layer has a ratio of coefficient of thermal expansion in the range of 5:1 to 1:5.

40 Claims, 8 Drawing Sheets

CARBON BASED COMPOSITE MATERIAL FOR MOLTEN METAL

CROSS REFERENCE TO RELATED APPLICATION

This application is a continuation-in-part of U.S. Ser. No. 09/105,942, filed, Jun. 26, 1998, which is a continuation-in-part of U.S. Ser. No. 09/059,924, filed Apr. 14, 1998, now U.S. Pat. No. 6,066,289 which is a continuation-in-part of U.S. Ser. No. 08/882,921, filed Jun. 26, 1997 now U.S. Pat. No. 5,968,223.

BACKGROUND OF THE INVENTION

This invention relates to molten metal such as molten aluminum, and more particularly, it relates to an improved method for fluxing molten metals such as molten aluminum using improved shaft design.

The use of a chlorine containing reactive fluxing gas, for the purpose of removing alkali elements (i.e., Na, Ca, K, Li), is a well established practice in the treatment of molten aluminum. Under equilibrium conditions, the respective chlorides of these elements are produced as reaction products. With the exception of LiCl, all of these halide salts, as pure species, are solid at normal treatment temperatures and thus are easily separated to the melt surface as a supernate and are removed by skimming.

Alkali elements are usually present at melt concentrations less than 500 ppm. According to the law of mass action (reaction rate approximately proportional to the concentration of reacting species), non-equilibrium metastable salts such as $AlCl_3$ and $MgCl_2$ (if Mg is present) are generated. These halides are undesirable because they contribute significantly to process airborne emissions. Further, $MgCl_2$ melts at 1306° F. and is typically molten at normal melt treatment temperatures. Molten salts are highly undesirable because of the difficulty of removing to the surface for skimming. Thus, it is highly desirable to react or complex the alkali elements to produce higher melting salts which in solid form are more efficiently separated by flotation to the surface.

In the prior methods of dispersing fluxing gas, for example, in a molten aluminum body, the fluxing gas is introduced down a shaft into the body and dispersed by a rotating impeller mounted on the shaft. However, this method is not without limitations. The rotating impeller creates a vortex about the shaft that indicates that a large portion of the molten metal is swirling or circulating about the impeller shaft at a rate approaching the rotation speed of the impeller. Fluxing media added to the molten metal tends to circulate with the molten metal with only minimal dispersion. Further, the vortex has the effect of increasing the surface area of the molten body exposed to air. The increased exposure of the molten metal to air results in an increase in dross formation, subsequent entrainment of the dross and its detrimental collateral effects. When the fluxing material is a gas, the vortex creates a problem in yet another way. Fluxing gas is displaced towards the center of the vortex by body force separation with the result that other parts of the molten body are not adequately treated with fluxing gas. Thus, the effectiveness of the process is reduced because portions of the molten body do not get treated with fluxing material. In addition, fluxing gas entrained in the molten metal flow pattern tends to coalesce, resulting in larger bubbles of fluxing gas developing in the melt. The larger bubbles lower the effectiveness of the fluxing process because less molten metal gets treated.

Common methods employed to suppress vortex formation include the insertion of baffles or rods into the melt. However, baffles are undesirable because a dead volume develops behind the trailing edges of the baffle. Another method used to suppress vortex formation is to limit power input to the impeller. However, this severely limits efficiency.

These problems continue to plague the industry as indicated in U.S. Pat. No. 5,160,693, for example, which discloses that with rotating impellers a surface vortex forms, the vortex rotating about and flowing downwardly along the impeller shaft, thereby agitating surface dross and drawing impurities back into the melt. The patent also indicates that an ideal system would minimize disturbances to the surface dross to prevent recontamination of the treated melt.

Thus, there is a great need for a more effective fluxing process which suppresses ingestion of dross from the surface back into the melt by vortex formation, for example, maintains the fluxing material finely dispersed throughout the molten body, and intensifies the contact of molten metal with fluxing material for improved fluxing of the melt.

SUMMARY OF THE INVENTION

An object of this invention is to provide an improved treatment process for dispersing media in molten metal.

Another object of this invention is to provide an improved fluxing process for molten aluminum.

Yet another object of this invention is to provide an improved shaft for use in molten aluminum.

Yet a further object of the invention is to provide an improved fluxing process for molten aluminum using a rotating impeller wherein substantially no vortex is formed.

And yet a further object of the invention is to provide an improved process for a body of molten aluminum wherein the fluxing gas is finely dispersed throughout the body for improved contact of fluxing gas with metal.

Still, yet another object of the invention is to provide a process for providing increased shear forces in a body of molten metal for improved dispersion of treatment media, such as fluxing gases and salts, throughout the body.

And still a further object of this invention is to provide a process for fluxing molten aluminum wherein large amounts of fluxing gas can be added without entrainment or fuming above the melt.

These and other objects will become apparent from a reading of the specification and claims and an inspection of the accompanying drawings appended hereto.

In accordance with these objects there is provided a method of treating a body of molten metal passing through a treatment bay having a surface. The method comprises providing a body of molten metal in a treatment bay and projecting an impeller on a shaft extending into the treatment bay through the surface to contact the molten metal. The shaft is comprised of a carbon or graphite material. A refractory layer substantially inert to molten aluminum is thermally deposited around the shaft extending above and below the surface of the molten aluminum, thereby greatly extending the useful life of the shaft. The carbonaceous material has a coefficient of thermal expansion of less than $10 \times 10^{-6}$ in/in/° F., and the refractory layer and the carbonaceous material have a coefficient of thermal expansion ratio in the range of 5:1 to 1:5.

DETAILED DESCRIPTION OF THE PREFERRED EMBODIMENTS

Figure 1:
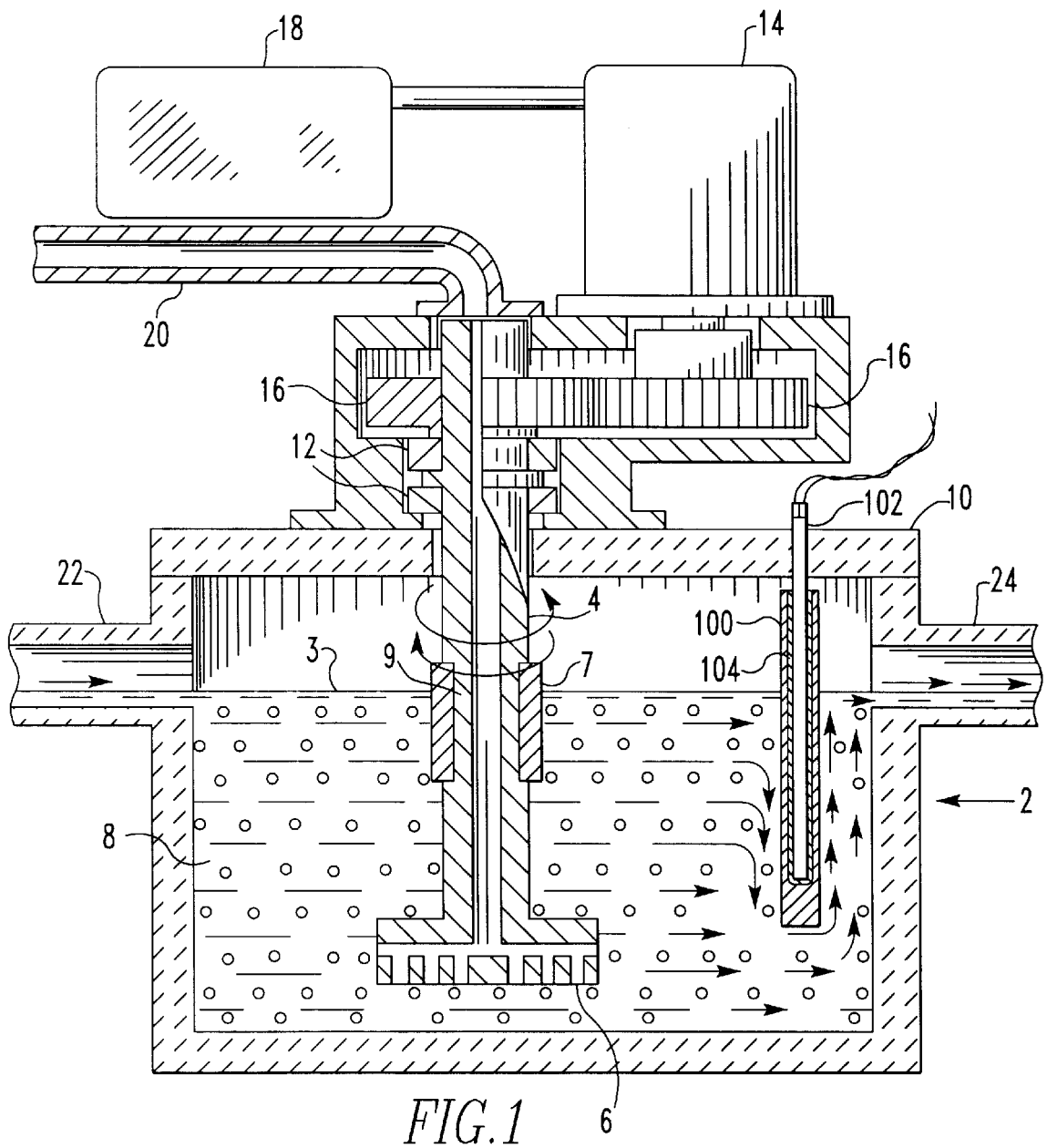
FIG. 1 is an elevational view in cross section illustrating the lack of vortex formation, molten metal flow characteristics and fluxing gas dispersion in the present invention utilizing a single impeller.

Referring more specifically to FIG. 1, there is shown a schematic of a gas fluxing bay 2 having a hollow shaft 4 and impeller or disperser 6 located in body of molten metal, e.g., aluminum, 8. Shaft 4 is carried by structure 10 and rotates on bearing 12. Further, shaft 4 is rotated by motor 4 through gears 16. Direction of rotation and revolution speed of motor 4 is controlled by control panel 18 and in accordance with the invention direction of rotation is periodically reverse for purposes of increasing shear forces minimizing vorticity as explained herein. Fluxing gas is added through tube 20 and down hollow shaft 4 before being dispersed through tubes or conduits in impeller 6 into molten aluminum 8. Instead of passing fluxing gas down hollow shaft 4, the fluxing gas may be added to the molten metal through a tube or other means. The fluxing gas may be injected adjacent impeller or disperser 6 for dispersing throughout the melt. Fluxing gases that can be used for molten aluminum in the present invention include nitrogen containing gases, carbon containing gases, e.g., fluorocarbons, halogen gases and the so-called inert gases; namely, helium, neon, argon, krypton, xenon, along with nitrogen, carbon dioxide and mixtures of these gases. In addition, chlorinaceous gases such as chlorine may be used individually or combined with the above gases. Combinations of fluxing gases that are useful in the present invention for fluxing aluminum base alloys include, for example, a combination of reactive gases such as chlorine and sulfur hexafluoride. A carrier gas such as carbon dioxide, nitrogen or an inert gas may be included with the reactive gases. When the combination of $Cl_2$ and $SF_6$ are used they may be present in the fluxing gas in a ratio that ranges from 2:1 to 10:1 parts $Cl_2$ to $SF_6$. A carrier gas may be present in this combination as long as the $Cl_2$ to $SF_6$ ratio range is maintained. The $Cl_2$ and $SF_6$ combination or other fluorine containing compounds such as fluorocarbons, e.g., hexafluorethane are useful for fluxing in accordance with the invention because the fluorine can form high melting point salts which have the capability of complexing with chloride species thereby increasing the melting point of the resulting salt mixture. Gas fluxing can be performed in batch or on a continuous basis. On a continuous basis, molten metal enters along conduit 22 and leaves by channel 24 after fluxing has taken place.

Figure 17:
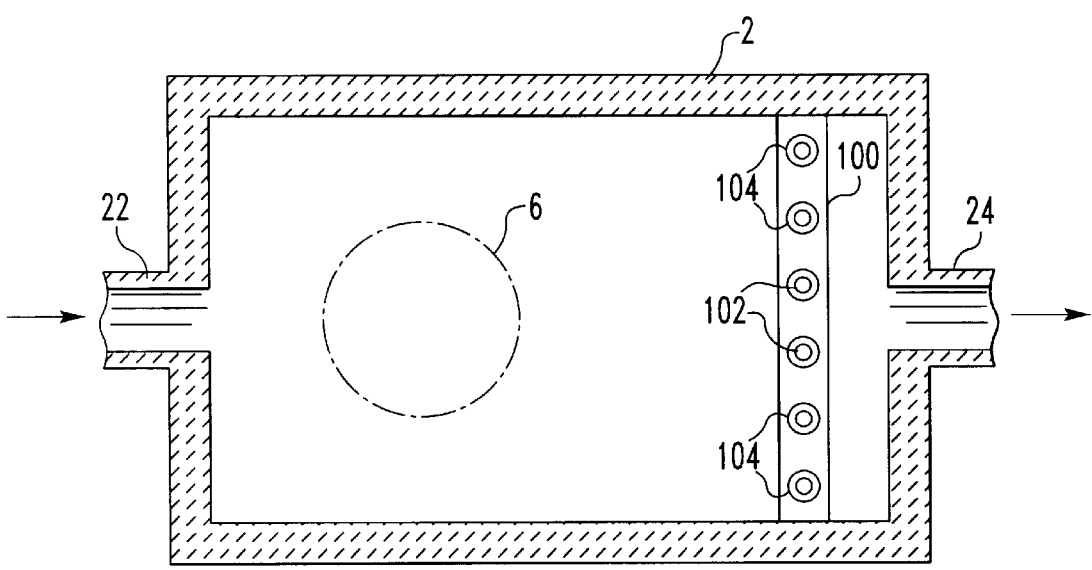
FIG. 17 is a top view of a molten metal treatment and heating bay in FIG. 1 showing a baffle heater extending between the sides of the bay.

In FIGS. 1 and 17, there is provided a baffle heater 100 which is shown extending across bay 2 to heat molten metal. That is, baffle heater 100 heats molten metal just prior to its leaving bay 2 prior to casting, for example. In the schematic shown in FIGS. 1 and 17, molten metal is shown flowing underneath baffle heater 100. Baffle heater 100 may be placed in other positions in bay 2. For example, baffle heater 100 may be placed along the sides (not shown) of bay 21 and may be spaced from the sides so as to permit heating of the molten metal by both sides of the baffle heater.

In the embodiment shown in FIG. 1, heating elements 102 are shown extending through lid 10. This permits ease of replacement for a non-functioning element.

The baffle heater may be fabricated from any material which is resistant to attack by molten metal, e.g., molten aluminum. That is, the baffle material should have high thermal conductivity, high strength, good impact resistance, low thermal expansion and oxidation resistance. Thus, the baffle can be constructed from silicon carbide, silicon nitride, magnesium oxide, spinel, carbon, graphite or a combination of these materials with or without protective coatings. The baffle material may be reinforced with fibers such as stainless steel fibers for strength. Baffle material is available from Wahl Refractories under the tradename "Sifca" or from Carborundum Corporation under the tradename "Refrax®20" or "Refrax®60".

In forming the baffle, preferably round holes having straight smooth walls are formed therein during casting for insertion of heaters thereinto. Further, it is preferred that the heating element 102 having a snug fit with holes in the baffle for purposes of transferring heat to the baffle. That is, it is preferred to minimize the air gaps between the heating element and the baffle. Sufficient clearance should be provided in the holes to permit extraction of the heating assembly, if necessary. Tubes or sleeves 104 (FIGS. 1 and 17) may be cast in place in the baffle material to provide for the smooth surface. Preferably, the tube has a strength which permits it to collapse to avoid cracking the baffle material upon heating. If the tubes are metal, preferred materials are titanium or Kovar® or other such metals having a low coefficient of expansion, e.g., less than $7.5 \times 10^{-6}$ in/in/° F. Preferably, the tube is comprised of refractory material substantially inert to molten aluminum. That is, if, after extended use, baffle heater 100 is damaged or molten metal intrudes to heating element 102, it is desirable to protect against attack by the molten aluminum. It is preferred to use a refractory tube 104 to contain heating element 102. Refractory tube 104 is comprised of a material such as mullite, boron nitride, silicon nitride, silicon aluminum oxynitride, graphite, silicon carbide and hexalloy (a pressed silicon carbide material). Such material should have a high thermal conductivity and low coefficient of expansion. The refractory tube may be formed by slip casting, pressure casting and fired to provide the refractory with suitable properties resistant to molten aluminum. Metal composite material such as described in U.S. Pat. No. 5,474,282, incorporated herein by reference, may also be used.

For purposes of providing extended life of the heating baffle, particularly when it is in contact with molten aluminum, it is preferred to use a non-wetting agent applied to the surface of the baffle or incorporated in the body of the baffle during fabrication. It is important that such non-wetting agents be carefully selected, particularly when the heating element is comprised of an outer metal tube. That is, when heating elements 102 are used in the receptacles or holes in the heating baffle which employs a nickel-based metal sheath, the non-wetting agent should be selected from a material non-corrosive to the nickel-base metal sheath. That is, it has been discovered that, for example, sulfur containing non-wetting agents, e.g., barium sulfate, are detrimental. The sulfur from the non-wetting agent reacts with the nickel based material of the metal sheath or sleeve. The sulfur reacts with the nickel forming nickel sulfide which is a low melting compound. This reaction destroys the protective, coherent oxide of the nickel-based sheath and continues until perforations or holes result in the sheath and destruction of the heater. It will be appreciated that the reaction is accelerated at temperatures of operation, e.g., 1400° F. Other materials that are corrosive to the nickel-based sheath include halide and alkali containing non-wetting agents. Non-wetting agents which have been found to be satisfactory include boron nitride and barium carbonate and the like because such agents do not contain reactive material or components detrimental to the protective oxide on the metal sleeve of the heater.

In another aspect of the invention, a thermocouple (not shown) may be placed in the holes in the baffle along with the heating element. This has the advantage that the thermocouple provides for control of the heating element to ensure against overheating of element 102. That is, if the thermocouple senses an increase in temperature beyond a specified set point, then the heater can be shut down or power to the heater reduced to avoid destroying the heating element.

For better heat conduction from the heater to the baffle material, a contact medium such as a low melting point, low vapor pressure metal alloy may be placed in the heating element receptacle in the baffle.

Alternatively, a powdered material may be placed in the heating element receptacle. When the contact medium is a powdered material, it can be selected from silica carbide, magnesium oxide, carbon or graphite. When a powdered material is used, the particle size should have a median particle size in the range from about 0.03 mm to about 0.3 mm or equivalent U.S. Standard sieve series. This range of particle size greatly improves the packing density of the powder and hence the heat transfer from the element to the baffle material. For example, if mono-size material is used, this results in a one-third void fraction. The range of particle size reduces the void fraction below one-third significantly and improves heat transfer. Also, packing the range of particle size tightly improves heat transfer.

Heating elements that are suitable for use in the present invention are available from Watlow AOV, Anaheim, Calif., International Heat Exchanger, Inc., Yorba Linda, Calif., and Ogden Manufacturing, Edinboro, Pa.

The low melting metal alloy can comprise lead-bismuth eutectic having the characteristic low melting point, low vapor pressure and low oxidation and good heat transfer characteristics. Magnesium or bismuth may also be bused. The heater can be protected, if necessary, with a sheath of stainless steel; or a chromium plated surface can be used. After a molten metal contact medium is used, powdered carbon may be applied to the annular gap to minimize oxidation.

Any type of heating element 102 may be used. Because the baffle extends about the metal line, the heaters are protection from the molten aluminum. Further, because the baffle supplies the heat to the metal, small diameter heating elements can be used, providing for a smaller heating bay.

The baffle heater in accordance with the invention has the advantage that both wall surfaces of the baffle heater transfer heat to the metal. Further, the baffle heater has the advantage that it applies heat to metal exiting the bay, which is traditionally the coldest area in the bay. Using a baffle heater of the invention has the advantage that no additional space is needed for heaters because they are placed in the baffle.

In the present invention, it is important to use a heater control. That is, for efficiency purposes, it is important to operate heaters at highest watt density while not exceeding the maximum allowable element temperature, as noted earlier. The thermocouple placed in holes in the baffle senses the temperature of the heater element. The thermocouple can be connected to a controller such as a cascade logic controller to integrate the heater element temperature into the control loop. Such cascade logic controllers are available from Watlow Controls, Winona, Minn., designated Series 988.

Figure 18:
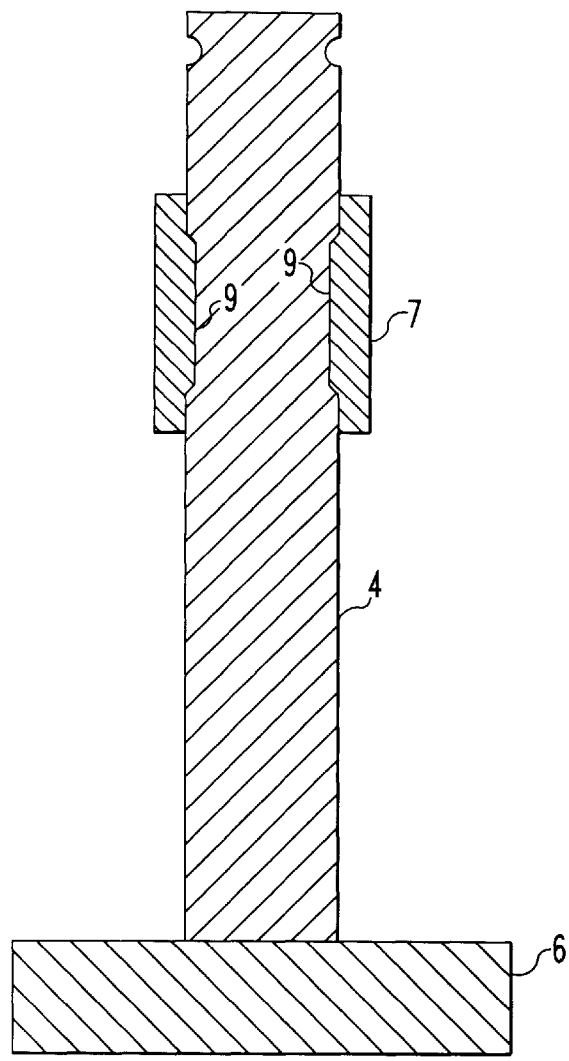
FIG. 18 is a cross-sectional view of the shaft and impeller of FIG. 1.

In FIGS. 1 and 18 there is shown an improved shaft 4 which carries impeller 6 for use in molten aluminum in container 2. At surface 3 of aluminum 8, graphite shafts have a high wear rate resulting from the high temperatures and the gaseous atmosphere above the molten metal. Thus, the graphite in shaft 4 oxidizes or burns, resulting in a substantially shortened life. It has been discovered that a protective refractory sleeve 7 resistant to attack by molten aluminum greatly extends the useful life of shaft 4. Refractory sleeve 7 may be constructed from any refractory with a preferred refractory selected from the group consisting of low density fused silica, mullite, SiAlON, silicon carbide, aluminum titinate, and alumina, low density fused silica being most preferred. Fused silica has high resistance to thermal shock. The low density aspect has the advantage that the refractory floats on the molten aluminum, if it shatters. Suitable fused silica is available from Whetstone Ceramics under the trade name FS-Al or from United Refractories, Pittsburgh, Penn.

Refractory sleeve 7 can be fitted on shaft 4 in any manner that ensures against slippage. Thus, sleeve 7 can be attached or secured on shaft 4 using refractory high temperature cements, for example. In a preferred embodiment, sleeve 7 is cast in place. That is, shaft 4 is first machined to provide, for example, two flat areas 9 opposite each other on shaft 4, as shown in FIG. 18, to maintain the shaft in balance. Thereafter, a cylindrical mold, used to encompass shaft 4, is filled with a slurry of refractory material surrounding flat areas 9. The slurry is permitted to set to a green strength before being baked or cured at higher temperatures, e.g., 850° F. for fused silica. Care is required to ensure that the mold is positioned concentric about shaft 4 to provide for balance as the shaft rotates.

It will be appreciated that any of a number of shapes may be provided on or in shaft 4 which will operate to secure refractory sleeve 7. Also, it will be noted that refractory sleeve 7 is positioned on shaft 4 to extend above and below metal surface 3. While other means can be used to secure sleeve 7 to shaft 4, it has been found that casting the refractory material in place has withstood rotation and change of rotation and the molten metal temperatures to greatly extend the useful life of shaft 4. In the present invention, the shaft may be rotated in uni-directional or bi-directional rotation.

In another approach to improving the useful life of carbon or graphite shafts, it has been discovered that a thin, refractory layer can be applied, e.g., thermally, to the shaft. This has the advantage that less weight is added to the shaft compared to the use of refractory sleeve 7 which obviates balance problems. Thus, it has been discovered that a plasma or flame sprayed refractory coating can be applied to a graphite base such as a shaft to provide a composite material having a carbonaceous base and refractory layer, preferably having a bond coating located between the base and refractory layer. For purposes of thermally applying a refractory layer, the coefficient of thermal expansion is required to be controlled. Thus, the carbonaceous material should have a coefficient of thermal expansion of less than $10 \times 10^{-6}$ in/in/° F. and preferably a coefficient of thermal expansion of less than $5 \times 10^{-6}$ in/in/° F. A typical coefficient of thermal expansion for graphite is, for example, $1.6 \times 10^{-6}$ to $3 \times 10^{-6}$ in/in/° F. The graphite typically will have a bulk density of about 115 lb/ft$^3$ and a grain size of 0.03 inch. Such graphite suitable in this aspect of the invention is available from Carbone of America, Saint Marys, Penn.

For purposes of protecting the shaft at the metal line from oxidation, abrasion or other degradation, a refractory coating is applied which extends above and below the metal line. The refractory coating can be any refractory material which provides the shaft resistance to such oxidation or degradation. The refractory coating can vary, depending on the molten metal contacting the shaft. Thus, a novel composite material is provided utilizing a carbonaceous base and refractory coating having the required coefficient of thermal expansion which greatly extends the useful life of the article, e.g., shaft, in contact with the molten metal.

Figure 19:
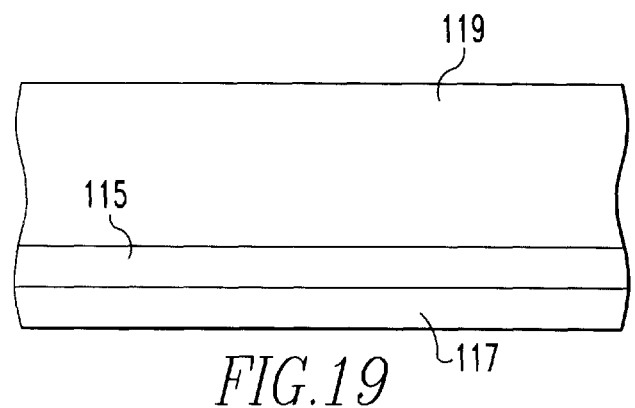
FIG. 19 is a cross-sectional view of a section of a shaft showing a base layer, a bond layer and a refractory coating.

When the molten metal in contact with the composite is aluminum, magnesium, zinc, or copper, etc., a refractory coating may comprise at least one of alumina, zirconia, yttria stabilized zirconia, magnesia, magnesium titanite, magnesium zirconate or mullite or a combination of alumina and titania. While the refractory coating can be used on a carbonaceous base 119, a bond coating 115 (FIG. 19) can be applied between the base material and refractory coating 117. The bond coating can provide for adjustments between the thermal expansion coefficient of the carbonaceous base, e.g., graphite, and the refractory coating when necessary. The bond coating thus aids in minimizing cracking or spalling of the refractory coat. When the shaft is cycled between operating temperature and room temperature, for example, when the shaft is reused, the bond coat can be advantageous in preventing cracking, particularly if there is a considerable difference between the thermal expansion of the graphite and the refractory.

Typical bond coatings comprise Cr—Ni—Al alloys and Cr—Ni alloys, with or without precious metals. Bond coatings suitable in the present invention are available from Metco Inc., Cleveland, Ohio, under the designation 460 and 1465. In the present invention, the refractory coating should have a thermal expansion that is plus or minus five times that of the base material. Thus, the ratio of the coefficient of expansion of the base material can range from 5:1 to 1:5, preferably 1:3 to 1:1.5. The bond coating aids in compensating for differences between the base material and the refractory coating.

The bond coating has a thickness of 0.1 to 5 mils with a typical thickness being about 0.5 mils. The bond coating can be applied by sputtering, plasma or flame spraying, chemical vapor deposition, or spraying, for example.

After the bond coating has been applied, the refractory coating is applied. The refractory coating may be applied by any technique which provides a uniform coating over the bond coating and which provides for consolidation of the matrix of individual particles comprising the refractory coating material. The refractory coating can be applied by aerosol sputtering, plasma or flame spraying, for example. Preferably, the refractory coating has a thickness in the range of 2 to 30 mils, e.g., 4 to 22 mils, preferably 5 to 15 mils with a suitable thickness being about 10 mils. The refractory coating may be used without a bond coating.

If plasma spraying is used, the refractory coating may be applied using a Metco 4M plasma depositions system using an argon-hydrogen carrier and ionization gas. Preferably, a Metco 461 bond coat is used. The refractory using such system preferably employs Metco 204 yitteria stabilized zirconia or Metco 210 magnesium zirconate. Surface temperatures are controlled in the range of about 90° to 425° F. and target distance is in the range of 3½ to 5 inches. The pail is typically rotated, and coating is applied at about 1 to 6 mils per pass.

The refractory coating 117 has a porous level in the range of about 1 to 20%. Pore diameter can range from 4 to 700 $\mu$m. Some of the pores are interconnected and can extend to base material 119. Other pores are blind and not interconnected and are beneficial in resisting thermal or mechanical shock induced cracking. Thus, it is preferred to seal such pores to avoid intrusion with molten aluminum or metal vapor or oxygen diffusion. Any method can be used which effectively closes the pores. A sealant for the pores should have a low viscosity and be capable of flow under low shear stress. Further, it should have low surface tension and be capable of intruding small pores by capillary conduction. In addition, the sealant should be capable of chemical reaction with the refractory coating or other reactants to form a stable reaction product that is substantially inert to molten aluminum and not injurious to the refractory coating. The sealant can be supplied as a single phase or colloidal suspension. Titanium tetrachloride is an example of such sealant which forms $TiO_2$ on hydrolysis. Silicon tetrachloride may also be used to form $SiO_2$. The titanium or silicon tetrachloride is applied as a liquid and then hydrolyzed. The titanium or silicon tetrachloride can be applied as a spray or by brushing. The hydrolysis reaction for titanium tetrachloride is as follows: $TiCl_4 + 2H_2O \rightarrow TiO_2 + 4HCl$. Alumina may also be used for pore closure by utilizing pyrolyzed aluminum.

Aluminum is applied in small particle form as an aerosol. This puts the aluminum particles in the pores which are then pyrolyzed by heating at a temperature range of 1100° to 1500° F. The aerosol is available from Seramtech and referred to as sermetal-w. Also, soluble aluminum may be used in the form of aluminum isopropoxide. Other treatments for sealing the pores on the refractory coating can include vitrification of the refractory coating surface, for example, by use of a laser treatment.

While the composite has been described with respect to shafts, the composite may be used for other members in contact with molten metal including tubes, impellers, slide gates, baffles, or graphite heating tiles.

The fluxing process removes both dissolved and suspended impurities, including oxides, nitrides, carbides, and carbonates of the molten metal and alloying elements. The dissolved impurities include both dissolved gases and dissolved solids. Dissolved gases in molten aluminum, for example, include hydrogen and dissolved solid particles include alkali elements such as sodium and calcium. When chlorine gas is added, for example, it forms the chloride salt of the impurity which rises to the surface and is removed. Suspended solids are transported to the melt surface by attachment to rising gas bubbles. Hydrogen is removed by desorption into the gas bubbles and is removed. Thus, it is important to keep a fine dispersion of fluxing gas or fluxing salt distributed throughout the melt in order to provide many sites for collection and removal of both dissolved and suspended impurities.

For purposes of fluxing in accordance with the present invention, shaft 4 and impeller or disperser 6 are iotated in either clockwise or counter-clockwise direction followed by reversing direction of rotation periodically. This has the effect of substantially eliminating formation of a vortex in the body of molten metal and the problems attendant therewith. Minimizing or eliminating the vortex greatly reduces the ingestion of dross from the surface into the body of melt being treated. More importantly, periodically reversing direction of rotation of impeller 6 has the effect of considerably increasing shear force developed in the molten metal, resulting in a more uniform, fine dispersion of fluxing material throughout fluxing bay. Adding fluxing material and reversing impeller rotation direction periodically increases fluid velocity gradients in the molten metal, particularly in the radial direction. It will be appreciated that adding fluxing gas and reversing direction of rotation of impeller 6 periodically has the effect of increasing the energy of mixing applied to the body of molten metal. However, the large increase in energy of mixing is obtained with substantially no vortex and the attendant problems of dross ingestion. For example, in prior gas fluxing methods, the impeller was rotated uni-directionally and the body of molten metal would be accelerated in the direction of rotation of the impeller resulting in formation of a vortex, and only minimal energy of mixing was applied during dispersing of fluxing gas. Further, metal in the body can be used as a reaction force, opposing the rotation of the impeller, thereby maximizing the energy input. As the body is accelerated in the direction of impeller rotation, the magnitude of the reaction force is proportional to difference in relative velocity between molten metal and impeller. In the present invention, reversing direction of rotation of impeller 6 periodically greatly intensifies the energy of mixing applied during dispersing of fluxing gas. This results in molten metal flow direction being directionless or random in the body of molten aluminum and without formation of a vortex.

By shear forces are meant the forces generated by a stream of molten metal in a body moving in one direction on a stream or portion of molten metal moving in another direction, for example, an opposite direction. For instance, when an impeller is rotated, the melt flows in the same direction as the impeller at a speed less than the speed of rotation of the impeller. However, both speeds are usually not very different. The greater the difference in these two speeds the greater is the capability for dividing fluxing gas into fine bubbles by the shear force. When the direction of rotation of the impeller is reversed, a stream of metal works on or creates a shear force on an adjacent stream or portion of molten metal until the whole body reverses direction. That is, the body is moving or rotating in one direction and when the impeller is reversed, a small portion of molten metal rotates in an opposite direction, the portion increases until the whole body rotates in a generally opposite direction. It is this period of reversing or changing direction of the molten metal which induces the greatest shear forces on adjacent portion or streams of molten metal to change directions.

By inducing movement of portions of the molten metal in different directions is meant that while first portions or streams of the molten metal are moving in one direction, for example, in a circular direction, other portions or streams are forced to move in another direction, for example, generally counter to the first portions or streams. The inducing of movement may also be performed by mixing means such as impellers, electromagnetic pumps, gas nozzles or tuyeres, and streams of molten metal introduced or applied to a body of the molten metal or a combination these mixing means. Further, moving portions of the molten metal in another direction by changing directions of applying the mixing means, for example, means that the direction of the impeller may be reversed or merely stopped periodically so as to induce shear stresses into the body of molten metal by having streams or portions of the molten metal going in one direction and then having streams or portions going in other directions. Another mixing means may be applied in another direction simultaneously or alternating with the first mixing means. For example, an impeller may be used to induce movement of a portion of the molten metal in one direction and an electromagnetic pump may be used to induce movement of a second portion in another direction to provide shear forces in the body.

By fluid velocity gradient is meant the velocity profile described by the quotient of the change in radial fluid velocity, $d_{V_r}$, and change in radial distance, dr. The velocity gradient is therefore, $d_{V_1}/dr$, by Newton's law of viscosity, the magnitude of the shear force, $\tau$, is related to the velocity gradient by the flow viscosity, n, as follows:

$$\tau = -\eta d_{V_r}/dr$$

With respect to the length of time before reversing the direction of rotation, this can extend to 10 minutes or more with a typical time period before reversing being less than 5 minutes with a suitable period being in the range of 0.1 seconds to 3 minutes. Or, the period for reversing can vary. For example, the reversing period may start at 5 minutes and then work down to 1 minute.

The present invention has the advantage that much higher levels of fluxing gas can be introduced to the melt at each fluxing stage. By use of stage as used herein is meant a body of molten metal employing at least a single impeller or disperser operated in accordance with the invention to disperse fluxing gas therein. That is, in the use of prior uni-directional rotating impellers, the amount of fluxing gas that could be added was very limited. Typically, the amount of fluxing gas that could be added using a single uni-directional rotating impeller could not exceed 0.7 SCF/hour. If greater amounts were added fuming would be observed above the melt. Fuming above the melt is indicative of incomplete reaction of the fluxing gas with undesirable constituents in the melt. The material which constitutes the fume is the unreacted gas, for example, chlorine or aluminum chloride. Thus, it will be seen that conventional systems using uni-directional rotating impellers are very inefficient. By contrast, in the present invention, very high levels of fluxing gas can be added per stage without fuming. That is, in the present invention fluxing gas can be added at a rate in the range of 1 to 650 SCF/hour and typically 1 to 425 SCF/hour or greater without the problem of fuming, depending to some extent on the aluminum alloy and the quality of the melt being fluxed. In certain modes, the fluxing gas can be added at a rate of 5 to 250 and in other modes at a rate of 5 to 50 SCF/hour and typically 10 to 25 SCF/hour, depending to some extent on the fluxing gas and the amount of metal being fluxed. It is believed that utilization of high levels of fluxing gases in the present invention result from operation under near equilibrium conditions and from high shear forces imposed on the melt. Therefore, there is more complete formation of the desirable equilibrium phases such as NaF, $CaF_2$, KF and LiF when fluorine containing gases are used. High metal shear forces result in efficient mixing of salt phases and separation thereof to the skim layer. Thus, the fluxing process of the present invention operates with enhanced kinetics and therefore minimizes the concentration of non-equilibrium salt phases produced during fluxing. The process results in efficient mixing and separation by the flotation method. Fluorine bearing gases in the process react to form a series of high melting point salts. These salts have the capability of effectively complexing or reacting with chlorine to increase the melting point of the resulting salt mixture which can be more easily separated as a solid.

Figure 2:
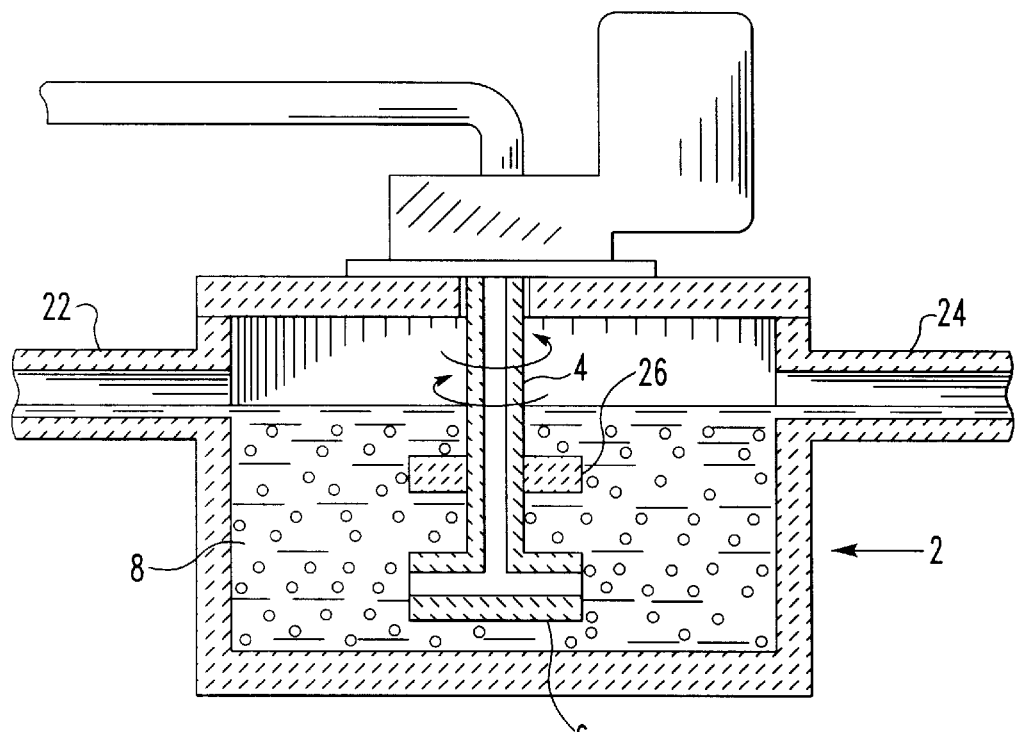
FIG. 2 is an elevational view in cross-section illustrating the invention using a double impeller.

FIG. 2 illustrates another embodiment wherein a second impeller 26 is fixed to a single impeller shaft 4. Impeller 6, fixed to the free end of shaft 4, can have a gas diffuser or nozzle or the gas can be supplied adjacent impeller 6 at a remote site in vessel 2 preferably below impeller 6. Additionally, impeller 26 may have a gas diffuser and can have the same configuration as impeller 6 or a different configuration which will aid in creating increased shear forces in molten metal when rotated in conjunction with impeller 6. Impeller 26 has the advantage of providing additional shear forces in the molten metal body when the rotation of the impeller is reversed. Thus, fluxing material is dispersed throughout the molten body with a higher level of intensity for a more efficient fluxing process. The times used for reversing can be similar to that used for the single impeller.

Figure 3:
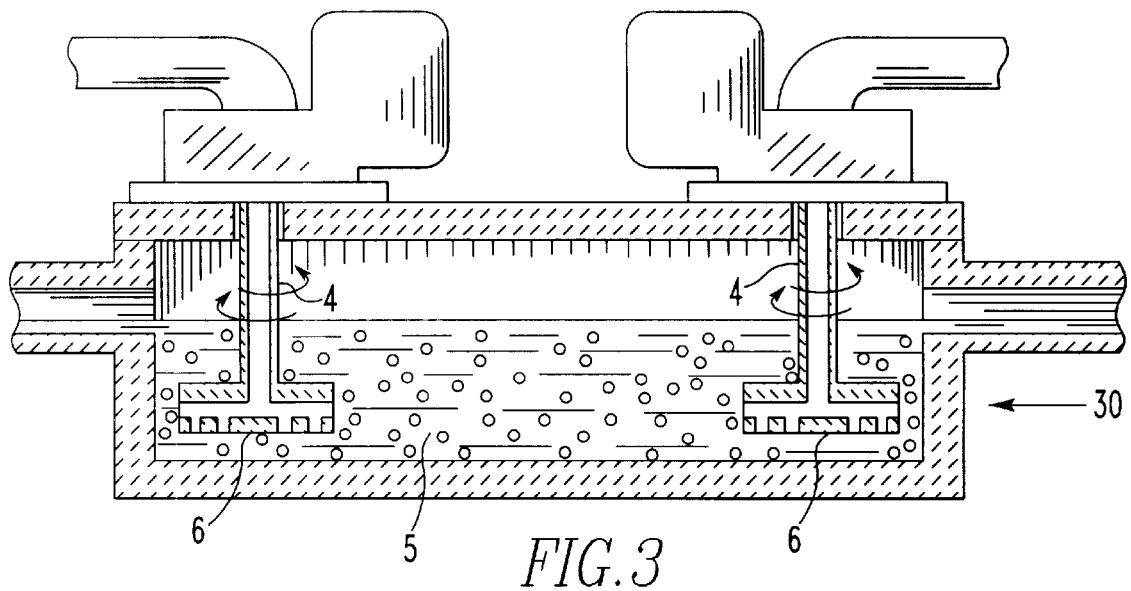
FIG. 3 is another cross-sectional view of twin impellers operating in accordance with the invention.

With reference to FIG. 3, there is shown another embodiment of the present invention including a containment vessel 30 having shafts 4 and impellers 6 containing molten aluminum 5. Shafts 4 and impellers 6 can be set to rotate in the same direction or opposite direction during the same time period. Thereafter, the rotation of each impeller is reversed periodically, usually in synchronization with the other impeller to provide for a high level of shear forces for dispersing of the media in the molten metal. Fluxing gas can be added in the same manner as referred to for the single impeller in FIG. 1. In this embodiment, the reversing cycle or period can be the same for each impeller or the reversing cycle can be shorter for one impeller and longer for the other and then these reversing cycles can be reversed in synchronization to obtain the most desirable combination of shear forces for dispersion. While two motors are shown driving the impellers in FIG. 3, one motor can be employed with the appropriate gears. The time periods for reversing direction of rotation can be similar to that described for FIG. 1.

Figure 4:
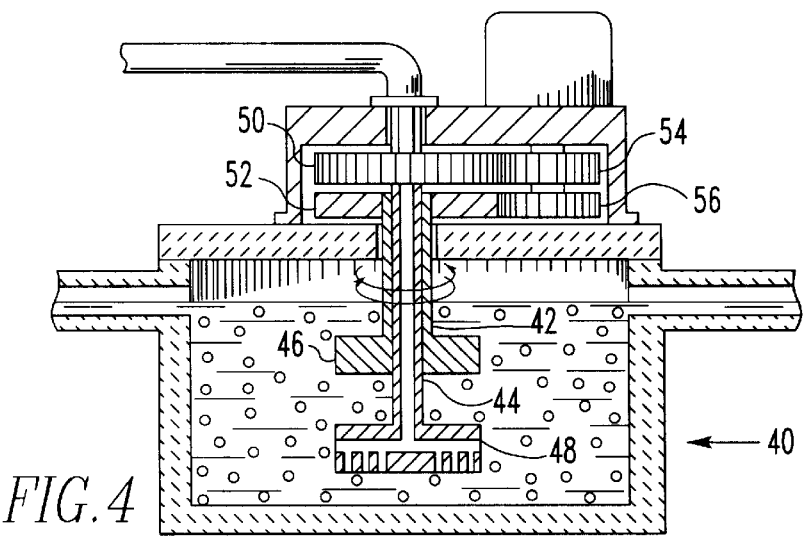
FIG. 4 shows a cross-sectional view of a further embodiment of the invention.

With respect to FIG. 4, there is shown a further embodiment of the present invention which includes a molten metal containment vessel 40 having two impellers on concentric shafts 42 and 44 which carry impellers 46 and 48. Fluxing gas may be supplied for fluxing purposes in the same way as referred to for FIG. 1. Additionally, for improved fluxing, the impellers 46 and 48 may rotate in the same direction for the same period of time. Further, impellers 46 and 48 may reverse direction at the same time for the same period. Or, impellers 46 and 48 may rotate in opposite directions for the same period, and both may reverse direction for the same period of time. Further, the rate of rotation for each impeller may be the same or one impeller may be set so as to rotate faster than the other in order to maximize shear force or the fluid velocity gradients in the molten metal. In the embodiment shown in FIG. 4, a single motor, which can be electric or air driven, is shown driving shafts 42 and 44 in the same direction of rotation through gears 50, 52, 54 and 56. In addition, the period or reversing cycle may be longer for one impeller than for the other impeller. Thus, it will be seen that various combinations of rates of rotation, direction of rotation, and periods of rotation may be utilized, all of which are intended to be encompassed within the scope of the invention because the specific details set forth are by way of illustration and not of limitation.

Figure 5:
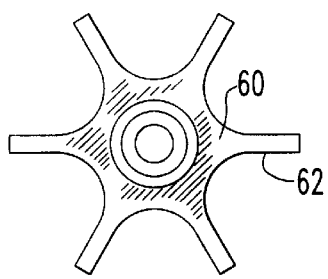
FIG. 5 is a top view of an impeller useful in the invention.
Figure 6:
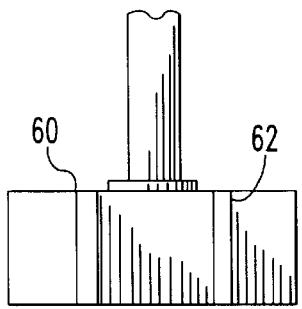
FIG. 6 is an elevational view of an impeller useful in the invention.
Figure 7:
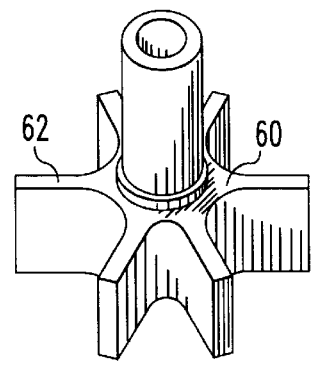
FIG. 7 is a perspective view of the impeller useful in the invention.

The impeller or disperser used in the present invention is any impeller or disperser which may be useful in creating shear forces in the melt for homogenization of the melt or for dispersing materials throughout the melt in accordance with the invention. Thus, the impeller may have canted vanes, and combinations of vanes may be used when two or more impellers are used. A suitable impeller 60, shown in FIGS. 5, 6 and 7, has vanes 62 substantially vertical to the plane of rotation. Such impeller is disclosed in U.S. Pat. No. 5,160,693 incorporated herein by reference.

The shaft and impeller may be made from graphite, silicon carbide or ceramic or such material which is compatible with molten metal such as molten aluminum.

The impellers of the present invention can rotate at an rpm in the range of 15 to 450 or combinations of such revolutions. The rate of rotation need not be constant. For example, the rate of rotation can be less at the beginning of the reversing period and can be higher at the end of the reversing period for purposes of inducing more constant shear stresses in to the melt.

Figure 8:
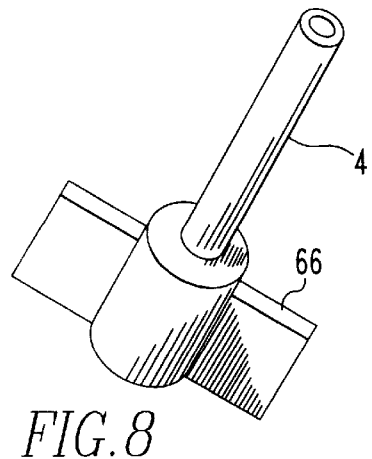
FIGS. 8 and 9 are embodiments illustrating impellers or paddles which may be used in accordance with the invention.
Figure 9:
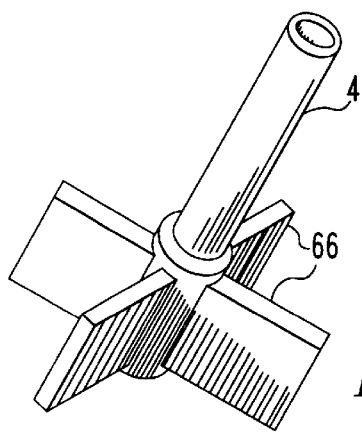

In addition, the impeller can have a flat paddle configuration as shown in FIG. 8 where shaft 4 terminates in flat plate 66. Fluxing gas may be added either remotely or through shaft 4 as disclosed earlier. Further, several flat plates 66 may be disposed along shaft 4 or shaft 4 may constitute a continuous plate at least to the extent that it is emerged in the melt. Plates 66 may be arranged as shown in FIG. 9, example, or any combination of plates may be used and such are intended to be encompassed within the scope of the invention. The plates or paddles generate very high shear forces in the melt in accordance with the invention and accordingly are very useful in the invention.

Figure 10:
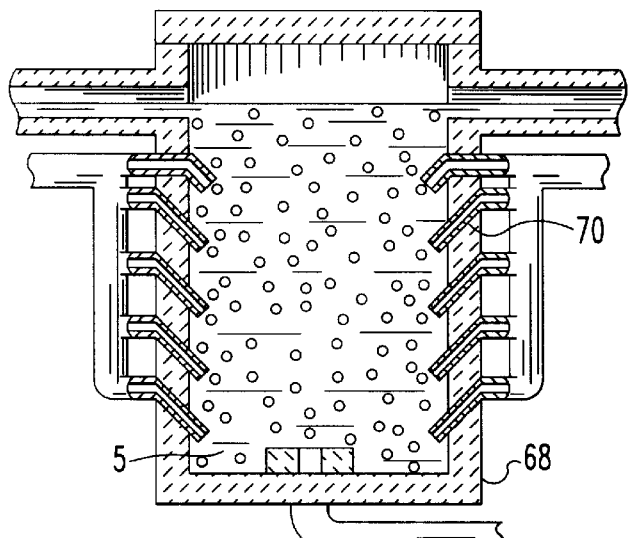
FIG. 10 is a cross section of a molten metal vessel employing tuyeres in the invention.
Figure 11:
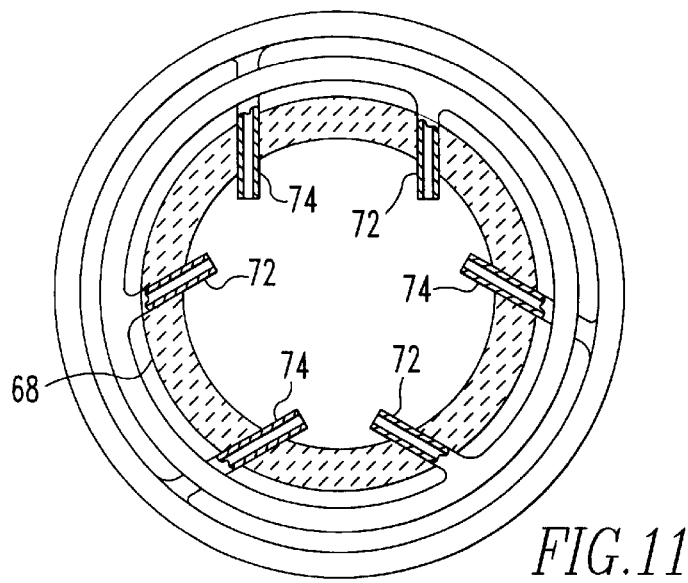
FIG. 11 is a cross section of the vessel of FIG. 10.

While generation of shear forces in melts such as molten metal having been demonstrated herein using impellers other mixing means or means for generating shear forces are contemplated. For example, shear forces may be generated by means of tuyeres 70, FIG. 10, in container 68 containing molten metal 5. In the configuration in FIG. 10, tuyeres 70 can be spaced apart up the side of container 68. One set of tuyeres 72 are arranged so as to direct gas or liquid such as molten salts therefrom in a clockwise direction and another set of tuyeres 74 can be positioned to direct gas or liquid therefrom in a counter current direction. One set of tuyeres are directed so as to move the melt in one direction and thereafter the second set of tuyeres are operated against the direction of the melt to generate shear forces therein to improve dispersion of fluxing material in the melt by reversing direction of melt flow.

In another embodiment the melt may be stirred in one direction by an electromagnet stirrer preferably in a circular direction. Afterwards, the electromagnet stirrer can be reversed periodically by reversing the electromagnetic field to generate shear forces in the melt and to promote intimate mixing or dispersing of media in the melt.

Figure 12:
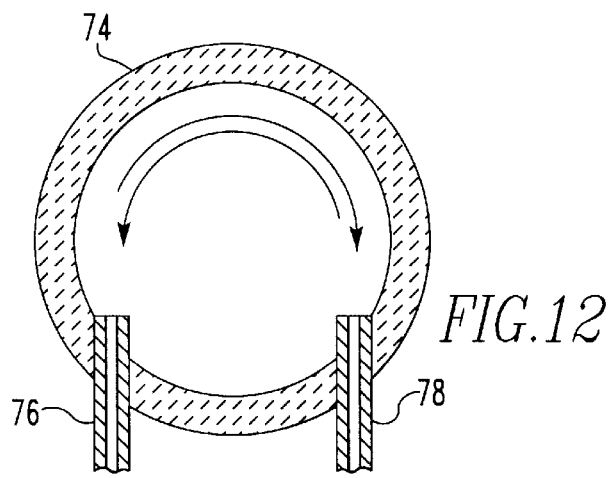
FIG. 12 is a top view of a molten metal vessel illustrating the use of molten metal conduits in the invention.

In FIG. 12, molten metal may be introduced to vessel 74 along conduit 76 to induce circular movement to the melt contained therein. Thereafter, the flow of molten metal along conduit 76 can be stopped and molten metal introduced through conduit 78 to generate shear forces in accordance with the invention. The flow of molten metal into vessel 74 can be alternated between conduits 76 and 78 to maintain a predetermined level of shear forces in the melt. It will be appreciated that combinations of these methods for generating shear forces are contemplated within the purview of the invention.

To facilitate fluxing efficiently, means is provided to interrupt gas flow to the body of molten metal at the time of rotation direction change of the impeller. This may be accomplished by use of a solenoid. In the preferred embodiment, and electric motor may be used to drove the impeller gearbox If a DC motor (direct current) is employed, the direction of rotation can be accomplished by reversing the direction of the applied current. Current reversal is facilitated by a set of timers to control the duration of rotation in either direction. This may be coupled to a double throw relay. An important element of the current reversing circuit is a means for ramping the applied current at a rate that does not mechanically shock the system immediately upon reversal. Also required is a mechanical device capable of bidirectional rotation that attaches the impeller to the drive shaft and the drive shaft to a gearbox. The preferred method of operating and reversing direction of rotation is set forth in U.S. Pat. No. 5,462,580 incorporated herein by reference.

The process in accordance with the invention has the advantage that it requires less processing time. Thus, there is considerable savings in the energy requirement to maintain the body of molten metal at temperature to perform the fluxing operation. Further, the process and system has the advantage that the equipment used for performing the fluxing can be downsized resulting in further savings. Because the subject system is more efficient in dispersing gas, considerably less gas is needed for the fluxing operation. In addition, because the present system is essentially vortex free when compared to conventional systems, less skim is generated and further only minimal skim is ingested into the melt. Thus, a protective layer of skim or salt or other material can be maintained on the surface of the body with substantially no ingestion. The system is generally more efficient in removing both dissolved and suspended impurities.

While mixing in accordance with the invention has been described with respect to fluxing bodies of molten metal, its use is not necessarily limited to fluxing. That is, the present invention has application to any body containing molten material or a molten phase which is to be mixed with another phase such as another liquid or a solid phase such as dispersing molten or solid salts in molten aluminum. Thus, the invention may be used for mixing a fluid body comprised of two or more phases. For example, the invention may be used for dispersing solid particles in molten metal such as silicon carbide particles in molten aluminum, e.g., mixing metals and non-metals. Further, the invention may be used for mixing two-phase aluminum systems such as molten aluminum and solid aluminum systems, for example, when molten aluminum is used to dissolve solid aluminum scrap. By media as used herein is meant to include gas, molten salts or solid salts and metals.

It should be understood that the shear forces and dispersion of media in the molten metal can be accomplished by a phase contactor or agitator provided in the body of molten metal. By disperser as used herein is meant to include any kind of phase contactor or agitator, including a propeller, impeller, nozzles, rotating plates, counterflow of molten metal and the like. Also, it will be understood that the shear forces and dispersion may be created by a rotating molten metal container or insert whose direction of rotation is reversed periodically in accordance with the teachings of this invention. Further, the shear forces and dispersion of media or mixing may be accomplished by rotating a molten metal container in one direction and rotating the phase contactor, e.g., impeller, in the opposite direction. The molten metal container may be mounted on a turntable for uni-directional rotation while the impeller is mounted to rotate uni-directionally opposite to the molten metal container.

Figure 13:
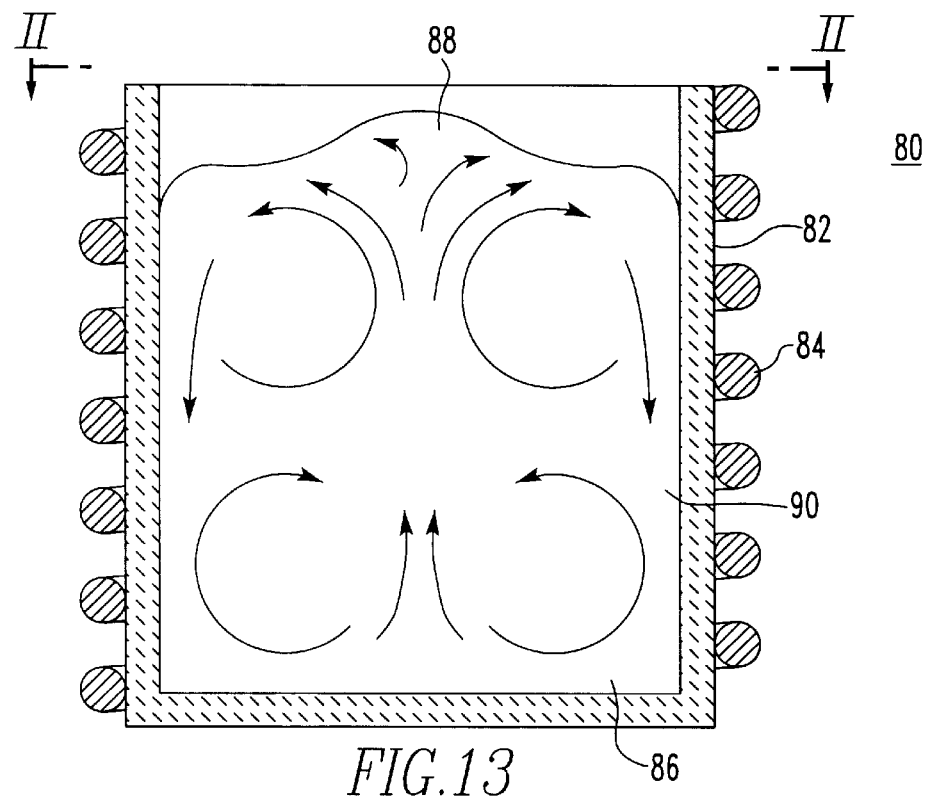
FIG. 13 is a cross section of an induction furnace showing molten metal flow direction.

Another embodiment of the invention employs a combination of induction furnace and a uni-directional disperser or impeller. One type of molten metal flow is illustrated in FIG. 13 which depicts an induction furnace 80 comprising a container 82 and induction coils 84. Molten metal 86 subjected to induction has a flow pattern where molten metal rises on the center portion or inner region 88. The molten metal then flows generally outwardly and downwardly at outer regions 90. The induction heater can operate to provide heat as well as a stirring action. It should be understood that other types of molten metal flow patterns can be obtained depending on the electric induction furnace, and such flow patterns are intended to be encompassed within the purview of the invention.

Figure 14:
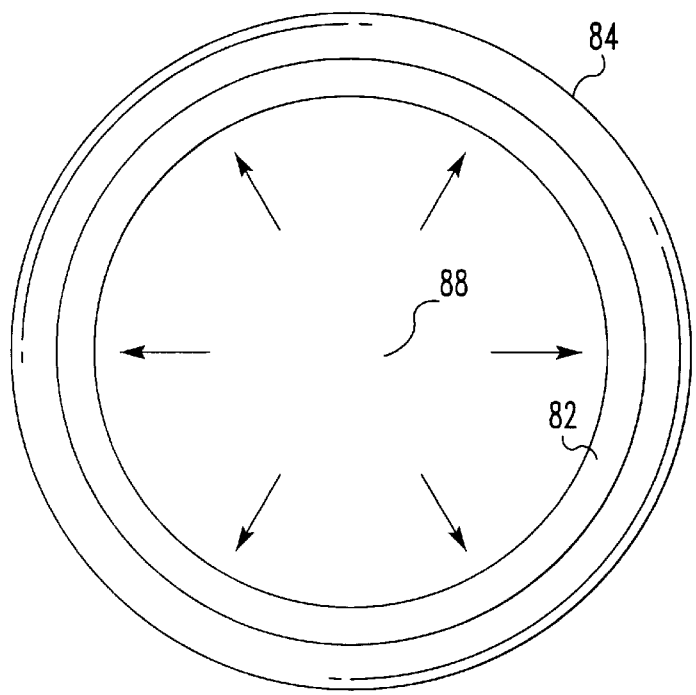
FIG. 14 is a top view along the line II—II of FIG. 13.
Figure 15:
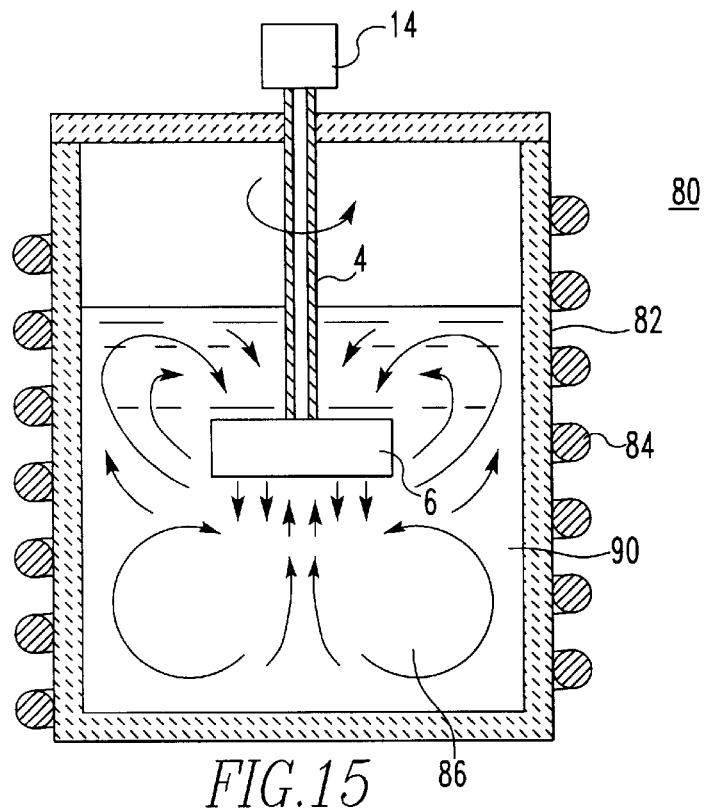
FIGS. 15 and 16 are cross-sectional views of a combination induction furnace and impeller showing molten metal flow showing different molten metal flow patterns.

The outward flow of molten metal at the top of the furnace is shown in FIG. 14. Thus, it will be seen from FIG. 13 that skim or other materials will be ingested which in a fluxing operation is very undesirable. Further, the turbulent surface results in generation of additional skim by exposure of new molten metal to air. When the induction furnace is operated simultaneously in combination with a unidirectional impeller as illustrated in FIG. 15, the surface is much less turbulent and can assume a quiescent type surface. Yet, because impeller 6 is rotated in a direction which opposes the upward flow of molten metal as illustrated in FIG. 13, very high shear forces are obtained in the molten metal. As explained earlier, the very high shear forces are beneficial in the fluxing operation.

In FIG. 15, there is shown an impeller 6 mounted on hollow shaft 4. The impeller is rotated uni-directionally to oppose the upward flow in the center of the furnace created by the induction coils. As noted, the opposing force created by the impeller results in very high levels of shear forces. This improves fluxing by dispersion of the fluxing gas in very small bubbles. Other fluxing material such as salts are equally well dispersed.

While the molten metal is shown flowing upwardly in the center of the furnace, it should be noted that other flow patterns may be obtained. For example, the molten metal may flow downwardly in the center region of the furnace and the impeller rotated in a direction to oppose the downward flow.

Further, while FIG. 15 shows only one impeller, it will be understood that two or more impellers mounted on the same shaft may be used with increased efficiency. In addition, while fluxing gas is shown being introduced down a hollow shaft, the fluxing gas may be introduced by any means, as explained earlier.

Figure 16:
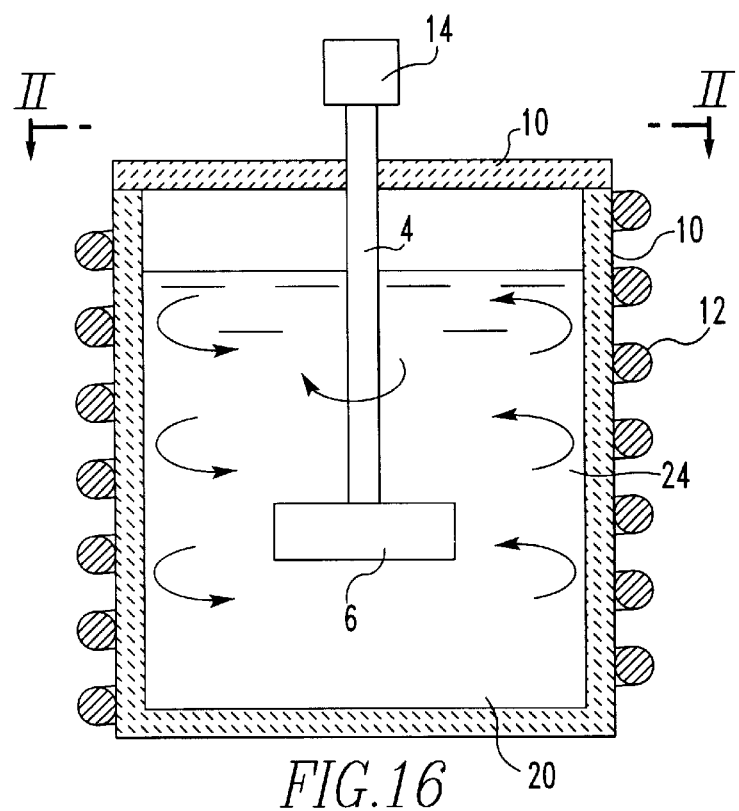

In FIG. 16, there is illustrated another embodiment of the invention utilizing induction coils and an impeller rotating uni-directionally. That is, induction coils 12 can be operated to circulate molten metal about or around shaft 4. When induction coils are operated to circulate molten metal in this manner, a vortex is formed and skim can be ingested. In the process of the invention, impeller 6 is rotated in a direction opposite to the circulating of the molten metal by the induction coils. This provides for high shear forces in the molten metal and fine bubbles maximizing the fluxing operation. Fluxing material may be introduced as disclosed earlier.

With respect to the impeller, any type impeller can be used which is efficient in introducing fluxing gas or which produces high shear forces in countering the flow of molten metal produced by the induction coils.

EXAMPLE

For purposes of demonstrating the effectiveness of reverse rotation for purposes of fluxing molten aluminum on a continuous basis, a chamber containing molten aluminum was used and an impeller having an 8 inch diameter was immersed in the molten aluminum to a depth of 25 inches. The chamber had a circular cross-section. The impeller was rotated at a speed of 425 RPM and the direction of rotation was reversed every 24 seconds. Molten aluminum was flowed through the chamber at a rate of 61,000 lbs/hour and the metal residence time in the chamber was 97 seconds. For purposes of hydrogen removal, argon gas was introduced through the impeller at a rate of 150 SCF/hour. Hydrogen concentration is given in $cm^3H_2(STP)/100$ g Al and determined by Ransley solid extraction method. Aluminum alloys AA6111 and AA3004 were tested. The results are as follows:

TABLE I

| Alloy Sample | Upstream $H_2$ Concentration | Downstream $H_2$ Concentration | % Reduction |
|---|---|---|---|
| 6111-1 | 0.23 | 0.09 | 61% |
| 6111-2 | 0.24 | 0.09 | 63% |
| 6111-3 | 0.26 | 0.09 | 65% |
| 3004-1 | 0.17 | 0.06 | 65% |
| 3004-2 | 0.19 | 0.04 | 79% |
| 3004-3 | 0.18 | 0.06 | 67% |

For purposes of testing alkali removal from AA5052 a fluxing gas of argon and chlorine was used where argon was flowed to the melt at a rate of 150 SCF/hour and chlorine, at 7.5 SCF/hour. The other conditions were as noted above. Trace element concentration in wt. % was determined by optical emissions spectroscopy. The results were as follows:

TABLE II

| Element | Upstream Concentration | Downstream Concentration | Stoichiometric Chlorine required |
|---|---|---|---|
| Sodium | 0.0008 w/o | 0.0002 w/o | 2.9 scfh |
| Calcium | 0.0012 w/o | 0.0007 w/o | 2.8 scfh |
| Lithium | 0.0003 w/o | 0.0002 w/o | 1.6 scfh |
| Total Stoichiometric Chlorine Requirement | | | 7.3 scfh |
| Actual Chlorine Used | | | 7.5 scfh |
| Overall Percent Stoichiometric Reduction | | | 97% |

It will be noted that $H_2$ was reduced by over 60% in all tests and that the overall percent stoichiometric reduction of Na, Ca and Li was 97%.

While the invention has been described in terms of preferred embodiments, the claims appended hereto are intended to encompass other embodiments which fall within the spirit of the invention.

What is claimed is:

1. An improved shaft suitable for use in the treatment of molten aluminum including pumping or fluxing employing an impeller, comprised of:
   (a) a shaft comprised of a carbon or graphite material having an exterior surface; and
   (b) a refractory layer comprised of consolidated particles to cover said exterior surface of said shaft, the refractory layer resistant to attack by said molten metal, said refractory layer and said carbon or graphite material having a coefficient of thermal expansion less than $5 \times 10^{-6}$ in/in/° F., said refractory layer and said carbon or graphite material having a ratio of coefficient of thermal expansion in the range of 5:1 to 1:5.

2. The shaft in accordance with claim 1 wherein a bond layer is provided between said carbon or graphite surface and said refractory layer.

3. The shaft in accordance with claim 1 wherein said refractory coating is a ceramic coating selected from one of the group consisting of $Al_2O_3$, $ZrO_2$, $Y_2O_3$, stabilized $ZrO_2$, $Al_2O_3$—$TiO_2$ and MgO—$ZrO_2$.

4. The shaft in accordance with claim 2 wherein said bond layer has a thickness in the range of 0.1 to 5 mils.

5. The shaft in accordance with claim 1 wherein said refractory layer has a thickness in the range of 2 to 30 mils.

6. The shaft in accordance with claim 2 wherein said bond layer is comprised of an alloy selected from the group consisting of Cr—Ni—Al alloy and Cr—Ni alloy.

7. The shaft in accordance with claim 1 wherein said refractory layer is thermally applied.

8. The shaft in accordance with claim 1 wherein said refractory layer is applied by flame spray or plasma spray.

9. The shaft in accordance with claim 1 wherein said refractory layer has a porosity of 1 to 20%.

10. The shaft in accordance with claim 9 wherein said porosity is sealed to provide pore closure.

11. The shaft in accordance with claim 1 wherein said refractory layer has pores sealed using a material selected from the group consisting of pyrolyzed aluminum and hydrolyzed titanium tetrachloride or silicon tetrachloride.

12. An improved shaft for use in the treatment of molten aluminum comprised of:
   (a) a carbonaceous material, said shaft being circular in cross section and having an exterior surface;
   (b) a bond coat bonded to said exterior surface;
   (c) a refractory layer thermally applied to said bond coat of said shaft, the refractory layer selected from one of the group consisting of $Al_2O_3$, $ZrO_2$, $Y_2O_3$, stabilized $ZrO_2$, $Al_2O_3$—$TiO_2$ and MgO—$ZrO_2$, the carbonaceous material having a coefficient of thermal expansion of less than $5 \times 10^{-6}$ in/in/° F., said refractory layer and said carbonaceous material having a ratio of coefficient of thermal expansion in the range of 5:1 to 1:5, the refractory having pores; and
   (d) a sealant applied to said pores to prevent intrusion of said pores.

13. The shaft in accordance with claim 12 wherein said sealant is selected from the group consisting of pyrolyzed aluminum and hydrolyzed titanium tetrachloride or silicon tetrachloride.

14. The shaft in accordance with claim 12 wherein said bond layer has a thickness in the range of 0.1 to 5 mils.

15. The shaft in accordance with claim 12 wherein said refractory layer has a thickness in the range of 4 to 22 mils.

16. The shaft in accordance with claim 12 wherein said bond layer is comprised of an alloy selected from the group consisting of Cr—Ni—Al alloy and Cr—Ni alloy.

17. A method for processing a body of molten aluminum using an impeller, the method comprising the steps of:
(a) providing a body of molten aluminum having a surface;
(b) projecting an impeller on a shaft into said body through said surface, said shaft comprised of:
   (i) a carbonaceous material having an outside surface and having a coefficient of thermal expansion of less than $5 \times 10^{-6}$ in/in/°F.;
   (ii) a bond coating applied to said outside surface; and
   (iii) a refractory coating thermally applied to said bond coating, said refractory coating having a coefficient of thermal expansion of less than $5 \times 10^{-6}$ in/in/°F., said refractory coating extending above and below said surface to protect said shaft against wear and oxidation degradation at said surface; and
(c) processing said body by rotating said impeller in an uni-directional mode or bi-directional mode.

18. The method in accordance with claim 17 wherein said refractory coating is a ceramic coating selected from one of the group consisting of $Al_2O_3$, $ZrO_2$, $Y_2O_3$, stabilized $ZrO_2$, $Al_2O_3$—$TiO_2$ and MgO—$ZrO_2$.

19. The method in accordance with claim 17 wherein said bond layer has a thickness in the range of 0.1 to 5 mils.

20. The method in accordance with claim 17 wherein said refractory layer has a thickness in the range of 2 to 30 mils.

21. The method in accordance with claim 17 wherein said bond coating is comprised of an alloy selected from the group consisting of Cr—Ni—Al alloy and Cr—Ni alloy.

22. The method in accordance with claim 17 wherein said refractory layer is thermally applied.

23. The method in accordance with claim 17 wherein said refractory layer is applied by flame spray or plasma spray.

24. The method in accordance with claim 17 wherein said refractory layer has pores sealed using a material selected from the group consisting of pyrolyzed aluminum and hydrolyzed titanium tetrachloride or silicon tetrachloride.

25. An improved composite suitable for use in contacting molten aluminum, the composite comprised of:
(a) a base layer of a carbonaceous material having a coefficient of thermal expansion of less than $5 \times 10^{-6}$ in/in/°F.;
(b) a bond coating applied to a surface of said base layer, the bond coating having a coefficient of thermal expansion of less than $10 \times 10^{-6}$ in/in/°F.; and
(c) a refractory layer bonded to said bond coating, the refractory layer resistant to attack by said molten aluminum, said refractory layer and said carbonaceous material having a ratio of coefficient of thermal expansion in the range of 5:1 to 1:5.

26. The composite in accordance with claim 25 wherein said carbonaceous material is graphite.

27. The composite in accordance with claim 25 wherein said refractory coating is a coating selected from one of the group consisting of $Al_2O_3$, $ZrO_2$, $Y_2O_3$, stabilized $ZrO_2$, $Al_2O_3$—$TiO_2$ and MgO—$ZrO_2$.

28. The composite in accordance with claim 2 wherein said bond layer has a thickness in the range of 0.1 to 5 mils.

29. The composite in accordance with claim 25 wherein said refractory layer has a thickness in the range of 4 to 22 mils.

30. The composite in accordance with claim 2 wherein said bond layer is comprised of an alloy selected from the group consisting of Cr—Ni—Al alloy and Cr—Ni alloy.

31. The composite in accordance with claim 25 wherein said refractory layer is a thermally applied layer.

32. The composite in accordance with claim 25 wherein said refractory layer is a flame or plasma sprayed layer.

33. The composite in accordance with claim 25 wherein said refractory layer has a porosity of 1 to 20%.

34. The composite in accordance with claim 33 wherein said seal is applied to provide pore closure to prevent intrusion.

35. The composite in accordance with claim 25 wherein said refractory layer has pores sealed using a material selected from the group consisting of pyrolyzed aluminum and hydrolyzed titanium tetrachloride or silicon tetrachloride.

36. An improved composite suitable for use in contacting molten aluminum having improved resistance to degradation at the molten aluminum surface, the composite comprised of:
(a) a base layer of carbonaceous material having a coefficient of thermal expansion of less than $5 \times 10^{-6}$ in/in/°F.; and
(b) a refractory layer thermally applied to said bond coat, the refractory layer selected from one of the group consisting of $Al_2O_3$, $ZrO_2$, $Y_2O_3$, stabilized $ZrO_2$, $Al_2O_3$—$TiO_2$ and MgO—$ZrO_2$, said refractory layer and said carbonaceous material having a ratio of coefficient of thermal expansion in the range of 5:1 to 1:5, the refractory having pores, said pores sealed to prevent intrusion of said pores by vapors.

37. The composite in accordance with claim 36 wherein said pores are sealed with a sealant selected from the group consisting of pyrolyzed aluminum and hydrolyzed titanium tetrachloride or silicon tetrachloride.

38. The composite in accordance with claim 36 wherein said bond layer has a thickness in the range of 0.1 to 5 mils.

39. The composite in accordance with claim 36 wherein said refractory layer has a thickness in the range of 4 to 22 mils.

40. The composite in accordance with claim 36 wherein said bond layer is comprised of an alloy selected from the group consisting of Cr—Ni—Al alloy and Cr—Ni alloy.

* * * * *